Patented Sept. 2, 1924.

1,507,338

UNITED STATES PATENT OFFICE.

STUART L. CRAWFORD, OF ROCHESTER, NEW YORK.

PECTIN FREED FROM PROTEIN AND STARCH.

No Drawing.   Application filed October 20, 1920. Serial No. 418,318.

*To all whom it may concern:*

Be it known that I, STUART L. CRAWFORD, a citizen of the United States, residing at Rochester, in the county of Monroe and State of New York, have invented certain new and useful Improvements in Pectin Freed from Protein and Starch, of which the following is a specification.

Pectin is a vegetable food product, which combined with sugar, organic acid and water, in suitable proportions, makes jelly. Pectin exists in abundant quantities in apples, the rind of oranges, and other fruit and vegetable products. Pectin can be extracted from such sources and combined with the juices or flavors of other fruits to make jelly, using the flavors of fruits that ordinarily will not make jelly. In this way, jellies can be made from such fruits.

Pectin extracted from apples frequently contains protein and starch, the flavor of the apples and vegetables coloring matter, the presence of all of which is objectionable.

The object of this invention is to provide a new and improved form or quality of pectin which has been made light in color and free from apple flavor and vegetable coloring matter, and which has been clarified by treatment of its nitrogenous compounds, such as proteids, by means of a proteolytic enzym, such as pepsin, which changes the form of the proteids. I believe that part of these proteids are rendered soluble and stay in solution and part of the soluble proteids combine with a part of the natural tannin of the fruit that is present in the pectin liquid or syrup and the two then precipitate, thereby removing both proteids and tannin and securing the more complete clarification of the pectin syrup and making it lighter in color.

I have found that the more the pectin is freed from proteids and tannin, the clearer it will be, the clearer it will keep and the less apt it is to become cloudy on long standing.

The pectin may also be treated to increase the clarification with a diastatic enzym to secure the conversion of any starch that may be present into soluble carbohydrates, which carbohydrates will then dissolve and go into solution.

For the purpose of extracting pectin, I preferably use the pomace of apples, which pomace is produced at the cider mill by grinding the apples and pressing the cider or juice therefrom, the pomace being left as a solid or pulp after the juice has been expressed. This pomace is then preferably dried. This drying preserves the pomace so that it can be stored and used at any time during the year in the manufacture of pectin syrup therefrom so that the pectin syrup can be made from it the year around.

The drying of the pomace also hardens the cells which has a beneficial effect which will presently be described.

In the process of extracting the pectin syrup from the dried pomace, I first immerse the dried pomace in water and bring it quickly to a boil. This dissolves out from the pomace any natural sugar that may still remain therein after the removal of the cider. It also dissolves practically all of the apple flavor and the vegetable coloring matter without dissolving the pectin so that the remaining pomace and the pectin that is yet to be extracted therefrom will be practically free from the apple flavor. The water is then drained off or filtered therefrom.

Owing to the hardening of the cells of the pomac by the drying, the pectin will not dissolve in the first boiling and is, therefore, not lost when the liquid is drained off from the pomace after the first boiling.

The pomace is then again mixed with fresh water in suitable quantity together with a fruit acid or some other organic acid, such as lactic acid, etc. The mixture is then boiled for about an hour or more and the liquid is then drained off and separated from the apple pulp or pomace and cooled to below 100° F. This liquid contains the pectin in solution and contains proteids, tannin and starch in solution or suspension.

I then add to the liquid a small percentage of proteolytic enzym, such as pepsin, which converts any proteins that may be present into soluble, nitrogeneous compounds, such as peptones and amides. Some of these nitrogenous compounds then combine with the tannin that is naturally present in fruit and in the pectin extracted therefrom and the combination so formed precipitates. In this way, a greater or less part of the proteids and the tannin is precipitated so that it may be separated from the liquid by filtration.

If starch is present, this may be converted into soluble carbohydrate, such as sugar, by the addition of a small percentage of amolytic enzym such as diastase. The sugar so made, goes into solution. The treatment of the liquid with the pepsin and the diastase may be carried on all in one operation.

After the conversion of the proteids and the starch is complete as above described, the solution is then filtered and the precipitates are removed thereby. The resulting pectin syrup secured in this way is lighter in color, free from the apple flavor and practically free from proteids and tannin or the amount thereof is greatly reduced and the starch is practically eliminated. The pectin syrup is clearer, has less fluorescence, makes a much better appearance and has better keeping qualities, and its appearance does not deteriorate on long standing.

With the removal of the apple flavor, the pectin syrup is neutral in flavor and when the pectin syrup is used in connection with fruit juices of delicate flavor, such as raspberry, strawberry, etc., the apple flavor having been removed, does not cover up or hide the flavor of the fruit. The light color of the pectin syrup makes it more desirable for its use in the manufacture of light colored jellies and jams, such as pineapple or peach jelly, or pear jam. etc.

I claim:

1. The process of producing a pectous compound consisting of treating a vegetable material to remove the natural sugar therefrom, treating the remaining pulp with a solvent to extract the pectous substances, treating the pectous liquor to convert any proteid therein into soluble forms such as peptones and amides and subsequently concentrating the liquor thus obtained.

2. The process of treating vegetable material consisting in first drying it, then immersing it in water and bringing it to a boil to dissolve the flavor, natural sugar and coloring matter, then draining the water therefrom and covering with fresh water and digesting the remaining pulp in the presence of a solvent for the pectous substances and removing the protein from the pectous liquid so obtained.

In testimony whereof, I affix my signature.

STUART L. CRAWFORD.